United States Patent Office 3,112,211
Patented Nov. 26, 1963

3,112,211
FLAME SPRAYED STEREOBLOCK POLY-
PROPYLENE COATINGS
Albert J. Ward, Jr., Metuchen, N.J., assignor to Esso
Research and Engineering Company, a corporation of
Delaware
No Drawing. Filed Aug. 21, 1961, Ser. No. 132,605
6 Claims. (Cl. 117—21)

This invention relates to the production of chemical, inert, organic, thermoplastic coatings on metallic surfaces. More particularly, it relates to the flame spraying of a particular type of polypropylene onto surfaces of the nature indicated and the products produced thereby.

It had been recognized that polyolefins such as polyethylene were useful materials in the preparation of corrosion resistant coatings for various surfaces because of their relative inertness. It had, therefore, been assumed that the recently made available crystalline, isotactic polypropylene would also be useful for similar purposes. It develops, however, that coatings on metallic surfaces of this polypropylene made by flame spraying are subject to excessive recrystallization and crazing of the coated layers upon cooling. This not only presents an undesirable appearance but also gives a product of excessive porosity and brittleness.

It has now been found that these problems in the flame spraying of polypropylene can be overcome by utilizing a specific polypropylene fraction as distinguished from the materials normally made available.

The metallic surfaces which are thus coated are typically made of ferrous metals such as in vats, tanks, reactors, panels, etc. It is desirable that these surfaces be cleaned such as in the conventional manner by sandblasting prior to the application of the coating.

The flame spraying is conducted in the conventional manner and typical conditions are described in the examples. A thin layer (10 to 15 mils) or a plurality of thin layers can be utilized. Propane or other fuels along with air and/or oxygen can be employed. The coating can be quenched with air or water to room temperature. Water quenching produces a darker coating than does air quenching.

For the purpose of convenience, details of the low pressure catalytic process for the preparation of the polypropylene are presented below, although it should be realized that these by themselves constitute no part of this invention. The process is generally described in the literature, e.g., see "Scientific American," September 1957, pages 98 et seq.

In that process the polymers are prepared by polymerizing the monomer with the aid of certain polymerization catalysts. The catalysts are solid, insoluble reaction products obtained by partially reducing a heavy metal compound usually the halide of a group IV–B, V–B and VI–B metal of the periodic system, such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33AlCl_3$ thus containing cocrystallized $AlCl_3$. (For further details, see copending U.S. application Serial No. 578,198, filed April 6, 1956, and Serial No. 766,376, filed October 19, 1958, now U.S. Patent 3,032,513.) The product is then activated with an aluminum alkyl compound corresponding to the formula $RR'AlX$. In this formula, R, R' and X preferably are alkyl groups of 2 to 8 carbon atoms, although X can alternatively be hydrogen or halogen, notably chlorine. Typical examples of the aluminum alkyl compounds are aluminum triethyl, aluminum sesquichloride, aluminum triisobutyl, etc.

The monomer is then contacted with the resulting catalyst in the presence of inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on the total liquid and the polymer product concentration and the polymerization zone is preferably kept between about 2 to 15% based on total contents so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, is normally added to the reaction mixture for the purpose of dissolving and de-activating the catalyst and for precipitating crystalline polymer product from solution.

For catalyst systems which produce a large amount of isotactic crystalline material, the stereoblock fraction is separated from the isotactic fraction by extraction with solvents, such as hot heptane.

Preferred catalysts for making such polymers are the vanadium chlorides or titanium bromides in combination with aluminum trialkyls. Catalyst combinations which favor the formation of stereoblock products can also be used such as lithium or zinc alkyls or $AlR_3$ (where $R>4$ carbons) in combination broadly with heavy metal compounds of groups IV to VI. The stereoblock polypropylene utilized has a density of between 0.860 and 0.890, preferably between 0.881 to 0.883 (ASTM D1505–57T) and an inherent viscosity in tetralin at 125° C. of 1.5 to 7, preferably between 3 and 5 (as regards stereoblock polymers, see Kresser, "Polypropylene" (1960), pages 72–74). The polymers are rubbery-like in nature and have a tensile strength between 200 and 3000 p.s.i. They thus differ from crystalline polypropylene. The stereoblock polypropylene is utilized as a powder and has a particle size of less than 100 mesh.

This invention and its advantages will be better understood by reference to the following examples:

*Example 1*

About 35 sand blasted steel panels were flame sprayed with an oxygen-propane torch with conventional isotactic polypropylene (see Kresser "Polypropylene" (1960), pages 13–15) and about the same number with the polypropylene claimed herein. Further details and average results are presented below.

The gas pressure setting was propane 15 p.s.i., oxygen 20 p.s.i., and air 30 p.s.i.

| Polypropylene | Porosity, seconds to failure [a] | Revers Impact Resistance, in. lb. [b] |
|---|---|---|
| Conventional: | | |
| (0.902 density) (2.1 deciliters/gram inherent viscosity) | 0–180 | 5–10 |
| "Stereoblock": | | |
| (0.883 density) (4.0 deciliters/gram inherent viscosity) | >1,200 | 80–160 |

[a] Tinius Olsen Holiday Detector.
[b] Variable Impact Tester with 5/8" diameter die.

The superiority of the materials of this invention is apparent. At least 16-fold improvements were obtained in impact resistance along with dramatic improvement in porosity.

A different polypropylene type material was prepared with 2.5 millimoles butyl lithium and 10 millimoles α- titanium trichloride in 15 ml. heptane diluent at 40° C. and 60 volume percent propylene. The total product was extracted with cold n-heptane to obtain an atactic fraction, representing 32% of the total. This fraction had the following properties: density=0.8542 g./cc., inherent viscosity=5.6 deciliters/gram. This product showed no crystallinity by X-ray examination and accordingly possessed no yield point when under a tensile stress and a tensile strength at break of only 290 p.s.i.

Attempts to prepare a fine powder of this material for flame spraying were unsuccessful due to the tacky nature of this atactic material. This demonstrates that not all atactic polymers lend themselves to flame spraying.

The advantages of this invention will be apparent to the skilled in the art. An economical and efficient method is made available for the preparation of corrosion resistant coatings which are not subject to environmental stress cracking and possess markedly improved heat resistance.

It is to be understood that this invention is not limited to the specific examples which have been offered merely as illustrations and that modifications may be made without departing from the spirit of the invention.

What is claimed is:

1. In a method for producing a polypropylene coating on a metal surface, the improvement consisting essentially of flame spraying a clean metal surface with powdered stereoblock polypropylene having a density in the range of 0.860–0.890 and an inherent viscosity in the range of 1.5–7 deciliters/gram thereby producing a polypropylene coated metal surface having a porosity of at least 1200 seconds to failure and a reverse impact resistance of at least 80 inch pounds as measured on a variable impact tester with a ⅝ inch diameter die.

2. The method of claim 1 in which the stereoblock polypropylene has a density in the range of 0.881–0.883.

3. The method of claim 1 in which the stereoblock polypropylene has an inherent viscosity in the range of 3–5 deciliters/gram.

4. A corrosion resistant metal product having a surface coated only with a thin layer of stereoblock polypropylene, said coating having a porosity of at least 1200 seconds to failure and a reverse impact resistance of at least 80 inch pounds as measured on a variable impact tester with a ⅝ inch diameter die and applied by flame spraying said surface with powered streoblock polypropylene having a density in the range of 0.860–0.890 and an inherent viscosity in the range of 1.5–7 deciliters/gram.

5. The product of claim 4 in which the stereoblock polypropylene has a density in the range of 0.881–0.883.

6. The product of claim 4 in which the stereoblock polypropylene has an inherent viscosity in the range of 3–5 deciliters/gram.

References Cited in the file of this patent

Kresser: "Polypropylene" (1960), (pp. 72–74 and 161 relied on), Reinhold Publishing Co.

Chem. Abs., vol. 53 (1959), p. 4802, "Chromatograpic Fractionation of Stereo Block Polymers," Giulio Natta et al., Ricera Sci. 28, 1473–9 (1958).